S. COLBURN.

Grain and Grass Harvester.

No. 1,695. Reissued June 7, 1864.

Witnesses
John B. Throug
A B Thompson

Inventor
C. Wheeler Jr.

N. PETERS, Photo-Lithographer, Washington, D. C.

UNITED STATES PATENT OFFICE.

CYRENUS WHEELER, JR., OF POPLAR RIDGE, NEW YORK, ASSIGNEE OF SYLVESTER COLBURN, OF ANSONIA, CONNECTICUT.

IMPROVEMENT IN GRAIN AND GRASS HARVESTERS.

Specification forming part of Letters Patent No. 13,160, dated July 3, 1855; Reissue No. 1,695, dated June 7, 1864.

DIVISION A.

*To all whom it may concern:*

Be it known that SYLVESTER COLBURN, of Ansonia, in the county of New Haven and State of Connecticut, has invented certain new and useful Improvements in Grain and Grass Harvesters; and I do hereby declare that the following is a full and exact description of the construction and operation thereof, reference being had to the accompanying drawings and the letters of reference marked thereon, in which—

Figure 1:
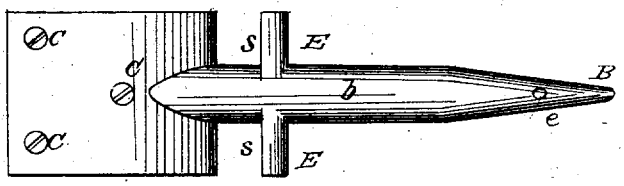
Figure 2:
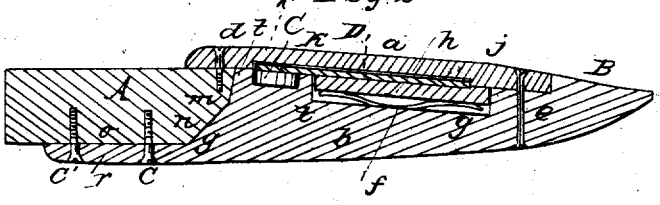
Figure 3:
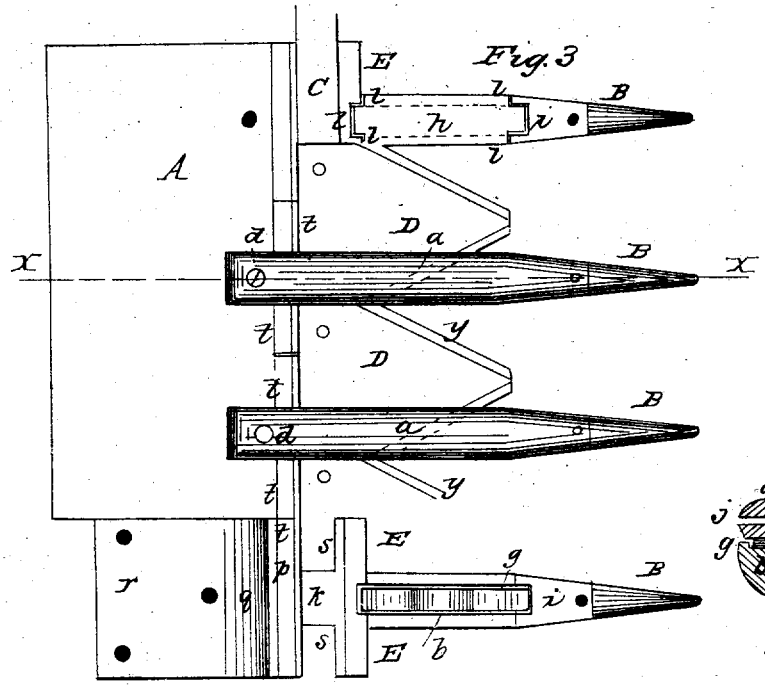
Figure 4:
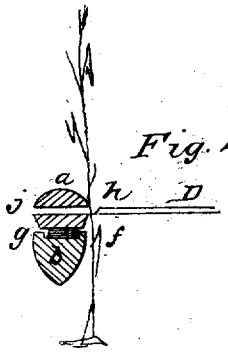

Figure 1 is a plan view of the under side of one of the guard-fingers. Fig. 2 is a transverse section of the finger-bar and cutter-bar, and a longitudinal section of the guard-finger, ledger-plate, and one of the cutter-sections, *x x*, Fig. 3, showing the plane of section. Fig. 3 is a plan or top view of the finger-bar, guard-fingers, cutter-bar, and sections, the upper part of one of the fingers being removed to show the position of the ledger-plate. In another the ledger-plate is also removed to show the spring under it, and the finger-bar is also removed to show the shank of the guard-finger. Fig. 4 is a transverse section of one of the guard-fingers, ledger-plate, spring, and cutter, *y y* showing the plane of section.

Similar letters, where they appear in the several figures, indicate corresponding parts.

The invention relates to that class of cutting apparatus for harvesters in which the guard-fingers support the grass or grain above as well as below the plane of the reciprocating cutter in its action in severing the crop; and the nature of the invention consists in so applying ledger or cutting plates to the fingers of harvesters as to make them elastic or self-adjusting; also, in the method of securing the plates in the guard-fingers, and also in combining with the ledger-plate and guard-finger brace-bars as bearings for the cutter.

Other branches of the invention will be fully described in another application bearing even date herewith, marked "B."

To enable others skilled in the art to make and use the invention, I will proceed to describe the same.

A is the finger-bar, to the under side of which the fingers B are fastened by screws or bolts *c*. In order to support the crop against the action of the cutter, the fingers B have an upper part, *a*, and lower part, *b*, united together in front of the cutter D by a rivet, *e*, and brought together in the rear of the cutter-bar C and fastened by a screw or bolt, *d*, to the top of the finger-bar A. An opening, *j*, is formed through the finger in the plane of the cutter D. This opening slightly exceeds in length the section of the cutter D, and slightly exceeds in depth the combined thickness of the cutter D and ledger-plate *h*. Over the brace-bar E it is little more than the thickness of the cutter, while back of the brace-bar E it exceeds the thickness of the cutter-bar C and cutter D, forming a gain or groove, *k*, for the cutter-bar C, in which it will slide freely.

In order to secure the ledger-plate *h* in the finger B and prevent its being displaced by the action of the cutter in severing the crop, and fit it to sustain the severe shocks imparted to it by hard unyielding substances getting between it and the cutter, recesses *i* are formed in the finger B for the reception of the ends of the plate *h*.

Between the recesses *i* there is formed in the finger a groove or cavity, *f*, in which is placed a spring, *g*, its convex side resting on the bottom of the groove and its ends pressing against the under side of the plate *h*.

The plate *h* may be formed with its upper surface flat, or with its edges slightly raised, so as to bring them in perfect contact with the edges of the reciprocating cutter. The edges of the plates should be inclined under, so as to form an acute angle at the upper corners. (See Fig. 4.)

To prevent the plate *h* from moving longitudinally, shoulders *l* are formed on the ledger-plate at each end.

The cutter D is of the ordinary scalloped form, constructed in sections, beveled on the upper side, and brought to a sharp flush edge with its lower side, and is fastened to the top of the cutter-bar C by rivets.

In order to keep the cutter, in its vibrations, in a uniform plane, brace-bars E are formed with the guard-fingers, of sufficient length on either side to meet when the fingers B are united to the finger-bar A, and form a continuous line of braces and a bearing between the ledger-plates *h* for the cutter D. The cutter D has a reciprocating motion imparted to it by any of the usual methods, and works directly over the ledger-plates *h*, the cutting being effected by the joint action of the sharp angular corners of the ledger-plates *h* and sharp flush edges of the cutter D, operating on the principle of shears, the grain and grass being at the same time prevented from bending over by the support afforded by the part *a* of the finger which is above the plane of the cutter D. (See Fig. 4.)

Having fully described the invention, what I claim as new, and desire to secure by Letters Patent, is as follows:

1. Making ledger-plates for harvester-fingers elastic by combining therewith a spring or its equivalent, substantially as set forth.

2. Securing the back end of the ledger-plate against lateral movement by a recess formed in the finger for its reception, substantially as set forth.

3. The construction of the guard-fingers with two recesses for securing the ledger-plate against lateral movement, substantially as and for the purposes set forth.

4. Forming the ledger-plate with shoulders *l* for preventing its longitudinal movement, substantially as set forth.

5. The brace-bars in front of the cutter-bar as lateral bearings for the cutter, in combination with the guard-finger and ledger-plate, substantially as set forth.

C. WHEELER, JR.

Witnesses:
JOHN B. STRONG,
A. B. THOMPSON.